Sept. 13, 1932. D. FINLEY 1,876,651
MACHINE FOR WRAPPING PIPES
Filed April 25, 1930
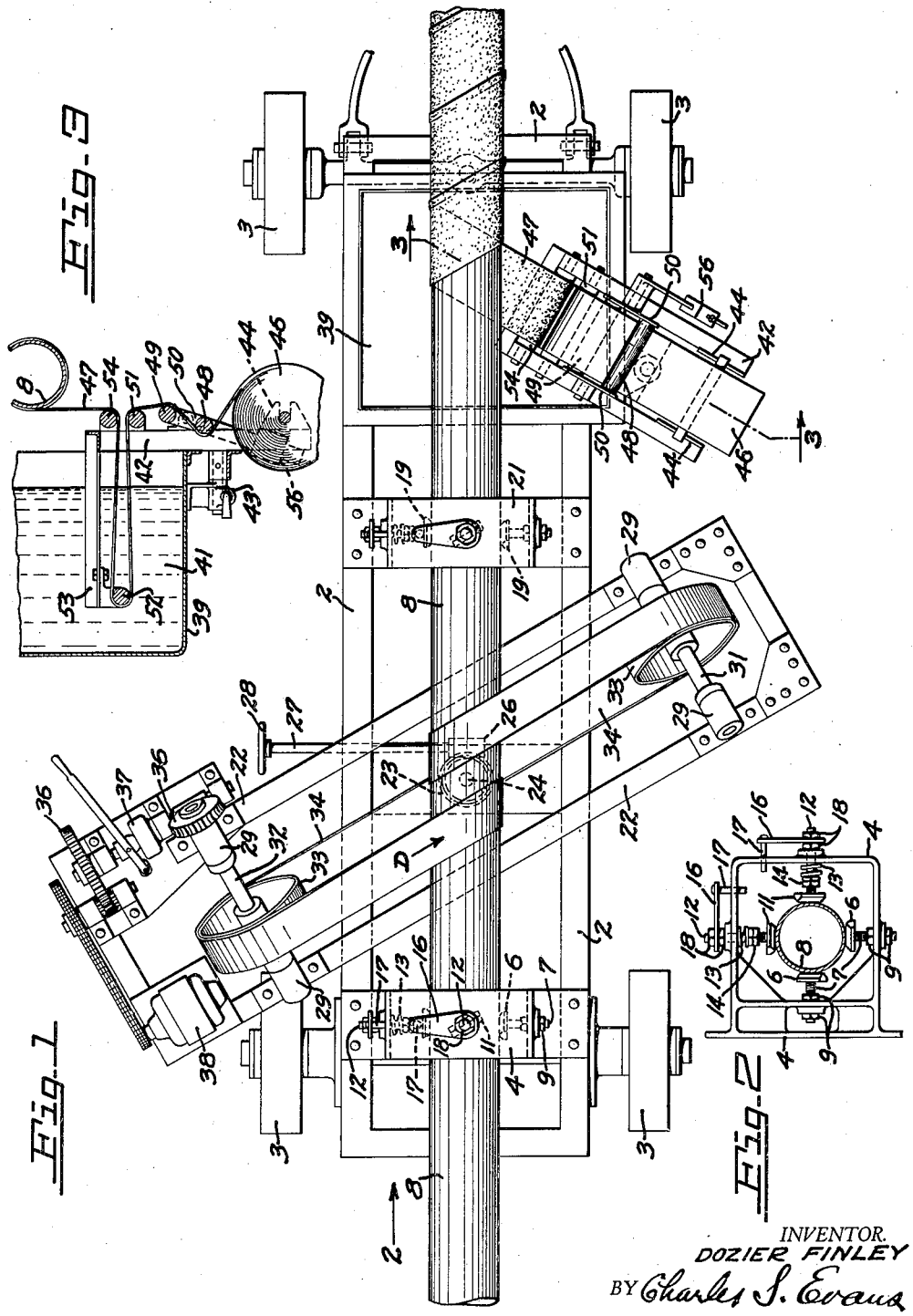
INVENTOR.
DOZIER FINLEY
BY Charles S. Evans
HIS ATTORNEY Patented Sept. 13, 1932

1,876,651

UNITED STATES PATENT OFFICE

DOZIER FINLEY, OF BERKELEY, CALIFORNIA, ASSIGNOR TO THE PARAFFINE COMPANIES, INC., OF SAN FRANCISCO, CALIFORNIA, A CORPORATION OF DELAWARE

MACHINE FOR WRAPPING PIPES

Application filed April 25, 1930. Serial No. 447,185.

My invention relates to a machine for wrapping cylindrical objects, such as pipe, with a protective covering.

One of the objects of my invention is the provision of a pipe wrapping machine of comparatively simple construction, and which is composed of few and simple parts, so that it may be manufactured economically.

Another object of my invention is the provision of a pipe wrapping machine, in which the pipe is firmly held while being wrapped.

Another object of my invention is the provision of supporting means for the pipe, which will effect screwing of the pipe therethrough with a combined rotary and longitudinal motion.

A further object of my invention is the provision of such supporting means, in the form of a nut.

A still further object of my invention is the provision with the pipe supporting elements, of mounting means to allow angular adjustment thereof, to fix the rate of pipe advance.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view of the pipe wrapping machine of my invention, illustrating a pipe being wrapped therein.

Figure 2 is an elevational view of the pipe supporting means for effecting screwing of the pipe with a combined rotary and longitudinal motion, looking in the direction of arrow 2 in Figure 1.

Figure 3 is a vertical sectional view, taken in a plane indicated by the line 3—3 of Figure 1. A portion of the structure is omitted from the view to shorten it.

In terms of broad inclusion, the pipe wrapping machine of my invention comprises means for supporting the pipe and effecting screwing thereof with a combined rotary and longitudinal motion, so that a protective material may be wrapped thereon in overlapping spirals. Preferably, the supporting means comprises a plurality of relatively sharp edge blocks positioned with the edges at a selected angle with respect to the axis of the pipe, so as to determine the relationship between the longitudinal and the rotary motion of the pipe. Mounting means are provided for the blocks to allow angular adjustment with respect to the pipe axis; and resilient means are provided for one or more of the blocks to allow for irregularities of the pipe.

Means are provided for moving the pipe, and thereby render the screwing means effective. A driven belt is preferably employed for this purpose, since such driving means is simple, and inexpensive to operate.

To complete the assembly, means are provided for supporting a roll of wrapping material which is drawn onto the pipe in a spiral as the pipe advances; and adjustable means are also provided to direct the wrapping strip onto the pipe at the proper angle. In order to cement the material to the pipe, means are provided for applying a cementitious fluid. Preferably a bituminous composition is employed for this purpose, since such material renders the wrapping waterproof and resistant to decay.

In greater detail, my device comprises a carriage 2, mounted on wheels 3 to provide a vehicle which may be readily moved about. Arranged at the rear of the carriage is a bracket 4 in which is carried a pair of relatively sharp edge blocks 6, preferably of hard metal, each mounted on the bracket 4 by means of threaded studs 7, passing through apertures in the bracket. The studs are fixedly held in position, with the edges of the blocks at a selected angle with respect to the axis of pipe 8, by means of suitable lock nuts 9. By merely loosening the lock nuts 9, it is apparent that the radial and angular position of the edges of blocks 6 may be readily adjusted; and upon tightening the lock nuts 9, the blocks are fixedly held in position. One of the blocks 6 is below the pipe, and the other block is on the side of the pipe.

On the opposite side of the pipe and above the pipe, are similar blocks 11, mounted in the bracket 4. The blocks 11 are carried by threaded studs 12 passing through apertures in the bracket 4, and are resiliently pressed against the pipe by means of springs 13 interposed between the bracket 4 and suitable lock nuts 14. For holding the blocks 11 with their edges in a selected angular position with respect to the axis of the pipe, arms 16 are mounted on the outer portion of each stud 12; which arms carry pins 17 movable in apertures in the bracket 4. The pins 17 are fixedly held to the studs by means of suitable lock nuts 18.

It is thus seen that the angular position of blocks 11, may be adjusted by merely loosening lock nuts 18, turning studs 12, and then tightening the lock nuts 18 to fixedly hold the blocks in the selected position. It is also obvious that the radial position of the blocks 11 may be adjusted. The resiliently held blocks are provided to compensate for inequalities and projections which may occur on the pipe.

Another set of relatively sharp edge blocks 19, mounted similarly to that of blocks 6 and 11, is mounted in bracket 21, adjacent the center of the carriage. The blocks of each set are held with their edges at the same angular position with respect to the pipe 8, and the corresponding block edges of each set are parallelly positioned.

From the preceding description, it is seen that if the pipe is positioned between the sharp edges of the blocks and the blocks are set with their edges at a selected angle with respect to the axis of the pipe, the blocks provide a nut to effect screwing of the pipe therethrough with a combined rotary and longitudinal movement, upon movement of the pipe. The relationship between the longitudinal and the rotary motions of the pipe is determined by the angular position of the block edges, which may be adjusted as described. Although the pipe may become slightly scored by the edges of the block, the cementitious fluid, which is later applied for cementing the wrapping to the pipe, acts as a filler in the scores. Furthermore, the scores provide a roughened surface, whereby the cementitious fluid obtains a firm bond with the pipe.

Means is provided for imparting movement to the pipe. Preferably a belt drive is employed due to the economy of such construction. A frame 22 is pivotally mounted between the brackets 4 and 21. The frame is angularly adjustable with respect to the axis of the pipe by means of gear 23 carried by the pivot pin 24 and in mesh with the worm 26, which may be turned by means of shaft 27 and hand wheel 28. Journaled in suitable bearings 29, adjacent each end of frame 22, are the shafts 31 and 32, each carrying a pulley 33 over which the endless belt 34 is stretched. One reach of the belt 34 is given a turn about the pipe, so that it may tractionally engage the pipe over a large part of its circumference.

The belt 34 is driven by means of suitable reduction gearing 36, clutch 37, and a prime mover 38 of any suitable type. In imparting motion to the pipe by the belt, the carriage 22 is adjusted, so that the driving belt 34 is approximately at the same effective angle as the angle of the block edges, to offer little as possible frictional resistance to the movement of the pipe through the blocks forming a nut. The belt is driven, as indicated by the direction arrow D in Figure 1, so that the rotation of the pipe is toward the non-resiliently held blocks, illustrated as blocks 6 in Figure 2. This insures firm positioning of the pipe.

Means are provided for applying the cementitious fluid. Mounted adajacent the forward end of carriage 2 is a tank 39 adapted to hold a suitable quantity of cementitious material 41, such as a bituminous composition, which may be kept in fluid condition by any suitable heat applying means; or which may even be a bituminous composition, fluid at normal temperatures, prepared for such purposes.

Arranged adjacent one side of the tank 39, is frame 42, pivotally mounted on a vertical axis, and which may be held in a selected angular position with respect to the pipe, by means of the clamping bearing 43. The frame 42 has suitable bearings 44 for journaling a roll 46 of strip wrapping material 47, preferably felt.

A pair of rollers 48 and 49 is journaled on the arm 50, pivotally mounted on frame 42. The wrapping strip is passed under the first roller 48; over the second roller 49; over the roller 51 journaled on the frame 42; down through the cementitious fluid in the tank; under roller 52 journaled in bracket 53, which extends downwardly into the tank and is mounted on the frame 42; upwardly over the roller 54 journaled on the frame; and then to the pipe. The counterweight 56 on the pivoted arm 50 places proper tension on the wrapping strip.

In operation, the frame 42 is first adjusted to direct the wrapping strip at the proper angle onto the pipe, and the strip is wound about the pipe a few turns by hand. As the pipe is advanced forward with a combined rotary and longitudinal movement, the strip is wound in overlapping spirals about the pipe. Since the strip is saturated with the bituminous material, it is securely cemented to the pipe.

I claim:

1. A pipe wrapping machine comprising means for moving the pipe, elements slidably engageable with the pipe and angularly disposed with respect to the pipe axis for effecting a combined rotary and longitudinal movement of the pipe.

2. A pipe wrapping machine comprising means for moving the pipe, a plurality of pipe supporting elements slidably engageable with the pipe and set at a selected angle with respect to the axis of the pipe for effecting screwing of the pipe therethrough, and mounting means for said elements to allow angular adjustment thereof.

3. A pipe wrapping machine comprising means for moving the pipe, a plurality of pipe supporting elements slidably engageable with the pipe and set at a selected angle with respect to the axis of the pipe for effecting screwing of the pipe therethrough, and mounting means for said elements to allow radial adjustment thereof with respect to the pipe.

4. A pipe wrapping machine comprising means for moving the pipe, and means for effecting screwing of the pipe to impart a combined rotary and longitudinal movement thereto, said screwing means including an element slidably engageable with the pipe and provided with means for resiliently holding it against the pipe.

5. A pipe wrapping machine comprising a plurality of pipe supporting blocks set at a selected angle with respect to the axis of the pipe, and means for moving the pipe.

6. A pipe wrapping machine comprising a plurality of pipe supporting blocks set at a selected angle with respect to the axis of the pipe, means for fixedly holding said blocks in the selected position, and means for moving the pipe.

7. A pipe wrapping machine comprising a plurality of relatively sharp edged pipe supporting blocks set at a selected angle with respect to the axis of the pipe and means for moving the pipe.

8. A pipe wrapping machine comprising a belt adapted to tractionally engage the pipe, means for driving the belt, and means including a plurality of relatively sharp edged pipe supporting blocks set at a selected angle with respect to the axis of the pipe for effecting screwing of the pipe to impart a combined rotary and longitudinal motion thereto.

In testimony whereof, I have hereunto set my hand.

DOZIER FINLEY.